United States Patent
Miya et al.

(10) Patent No.: US 7,093,344 B2
(45) Date of Patent: Aug. 22, 2006

(54) SLACK-FORMING MECHANISM FOR STATOR COIL

(75) Inventors: Taiichi Miya, Tokyo (JP); Naohiko Aoyama, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 370 days.

(21) Appl. No.: 10/607,594

(22) Filed: Jun. 27, 2003

(65) Prior Publication Data

US 2004/0051410 A1    Mar. 18, 2004

(30) Foreign Application Priority Data

Jun. 28, 2002    (JP)    ............................ 2002-190204

(51) Int. Cl.
*H02K 15/00* (2006.01)
*H02K 15/14* (2006.01)
*H02K 15/16* (2006.01)

(52) U.S. Cl. .................. 29/596; 29/566.1; 29/597; 29/598; 29/732; 29/736; 242/432.6; 310/71; 310/90; 310/216

(58) Field of Classification Search .............. 29/596, 29/566.1, 597, 598, 732, 736; 242/432.6; 310/71, 90, 216

See application file for complete search history.

(56) References Cited

U.S. PATENT DOCUMENTS

| | | | | |
|---|---|---|---|---|
| 5,090,108 A | * | 2/1992 | Banner et al. | ................. 29/596 |
| 5,535,503 A | * | 7/1996 | Newman | ....................... 29/596 |
| 5,990,589 A | * | 11/1999 | Ushikoshi | ..................... 310/90 |

* cited by examiner

*Primary Examiner*—A. Dexter Tugbang
*Assistant Examiner*—Tim Phan
(74) *Attorney, Agent, or Firm*—Joel E. Lutzker, Esq.; Anna Vishev, Esq.; Schulte Roth & Zabel LLP

(57) ABSTRACT

A slack-forming mechanism for stator coils that is able to impart slack of appropriate size to the stator coil without imposing an excessively heavy burden on the coiling machine. The slack-forming mechanism includes a coiling machine attachment jig having a protruding member that passes through a clearance formed between a stator body and connector, and has a top edge positioned higher than a clearance pass-through part of a stator coil. As it is possible to form slack in the stator coil without changing the configuration of the coiling machine, deficiencies in prior art slack-forming mechanisms are overcome such as the difficulty of maintaining uniform slack amounts, and unreliability. Moreover, since design-related restrictions are few, an adequately large slack is imparted to the stator coil to adequately suppress breakage of the stator coil induced by temperature change.

3 Claims, 4 Drawing Sheets

SLACK-FORMING MECHANISM FOR STATOR COIL

CROSS-REFERENCE TO RELATED APPLICATIONS

This application claims priority from Japanese Patent Application No. 2002-190204 filed on Jun. 28, 2002.

FIELD OF THE INVENTION

This invention relates to a slack-forming mechanism for the stator coils of electric rotating machines such as resolvers and motors.

BACKGROUND OF THE INVENTION

A VR resolver (variable reluctance resolver) which is one example of a rotating machine, is shown in FIG. 4. In FIG. 4, the VR resolver 1 is roughly configured by providing a plurality of magnetic teeth 4 on the inside of the annular stator stack 3 of the stator 2, winding a stator coil 5 onto the plurality of magnetic teeth 4, and providing a rotor (not illustrated in the drawing) inside the stator 2. The stator stack 3 consists of a core part (not illustrated in the drawing) and an insulator 6 (insulation) that is provided to cover the core part. The stator 2 consists of the stator stack 3, stator coil 5, and a resin connector 10 that is provided with two attachment pins 8, 9 that are enwrapped by the terminal part 7 of the stator coil 5 and connect to outside wiring (not illustrated in the drawing). The connector 10 is integrally formed with the insulator 6 of the stator stack 3.

In the slack-forming mechanism shown in FIG. 4, a circular rod 11 that is provided in the coiling machine (not illustrated in the drawing) is disposed on the connector 10 between the magnetic teeth 4 and the attachment pins 8, 9. The stator coil 5 contacts the circular rod 11 and crosses over it, and the terminal part 7 of the stator coil 5 wraps around the attachment pins 8, 9. Because the stator coil 5 contacts the circular rod 11 and crosses over it, a slack is imparted (formed) in the stator coil 5, and breakage of the stator coil 5 due to temperature change is impeded.

Another example of a mechanism that forms slack 12 in the stator coil 5 (a slack-forming mechanism for stator coils) is shown in FIG. 5. This slack-forming mechanism for stator coils is provided in a VR resolver configured similarly to the VR resolver shown in FIG. 4. In FIG. 5, in the vicinity of the connector 10, two resin pins (bypass pins 15) are installed as the slack-forming mechanism for stator coils. In the slack-forming mechanism for stator coils shown in FIG. 5, the terminal parts 7 of the stator coils 5 wrap around the attachment pins 8, 9 in a state where the stator coils 5 pass around the outside of the two by-pass pins 15.

In the slack-forming mechanism for stator coils shown in FIG. 4, as the pertinent slack-forming mechanism is provided in the coiling machine (circular rod 11), it adds to the complexity of the coiling machine, and in this connection it is difficult to guarantee the stable operation of the slack-forming mechanism for stator coils and consequently, it becomes difficult to uniformly control the slack amount, and reliability tends to decline.

With the slack-forming mechanism for stator coils shown in FIG. 5, there are restrictions on the attachment positions and the like of the by-pass pins 15, it is not able to impart an adequate slack 12, and there is the danger that it is not able to adequately inhibit breakage of the stator coils 5 induced by temperature change.

SUMMARY OF THE INVENTION

The present invention is made in light of the aforementioned circumstances, and an object of the present invention is to offer a slack-forming mechanism for stator coils that is able to form slack of appropriate size in the coil without imposing an excessively heavy load on the coiling machine.

Accordingly, in a first aspect of the present invention, a slack forming mechanism is provided including a stator attachment jig for receiving and coupling a stator to a coil winding machine and a slack forming member extending from the jig and adapted to extend through an opening between a stator body and a coil wire connector, the slack forming member upwardly deflecting a winding coil to create slack in a coil.

In another aspect of the present invention, a slack-forming mechanism is provided for an annular stator stack possessing a plurality of magnetic teeth on an inside wall, stator coils that wind around the plurality of magnetic teeth and having terminal parts, a connector provided with attachment pins to which the terminal parts of the stator coil are coupled, and two projecting parts that extend substantially in parallel from an outer periphery of the stator stack and that hold the connector arranged between them such that a clearance is formed between the connector and the stator stack, comprising an attachment jig for coupling the stator stack to a coiling machine and including a protruding member extending through the clearance and having a top edge that projects above the clearance, wherein slack is formed in a stator coil by having the stator coil traverse the clearance and contact the protruding member to upwardly deflect the stator coil to form the slack.

In still another aspect of the present invention, a stators device is provided for mounting to a jig attachment for a coil winding device having a slack forming member, comprising a stator body including a plurality of magnetic teeth disposed along an inner periphery of the stator body at least two substantially parallel projecting members extending from an outer periphery of the stator body, and a connector block disposed between the projecting member for receiving terminal ends of stator coils extending from the plurality of magnetic teeth wherein an opening is formed between the connector block and the outer periphery of the stator body such that when the stator body is mounted to a jig attachment, the slack forming member extends through the opening and imparts slack to coil wires traversing the slack forming member and extending between the stator magnetic teeth and the connector block.

Further features and advantages of the invention will become evident to one skilled in the art upon reading of the detailed description of the invention, which is given below by way of example only and with reference to the accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION

Figure 1:
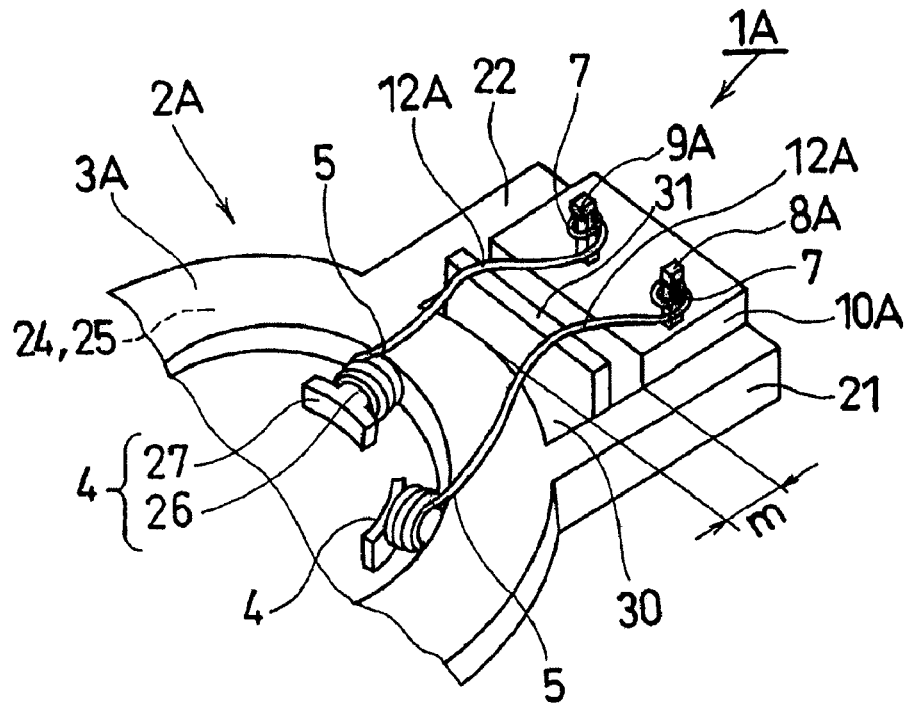
FIG. 1 is a perspective view of an exemplary slack-forming mechanism for stator coils according to an embodiment of the present invention.
Figure 2:
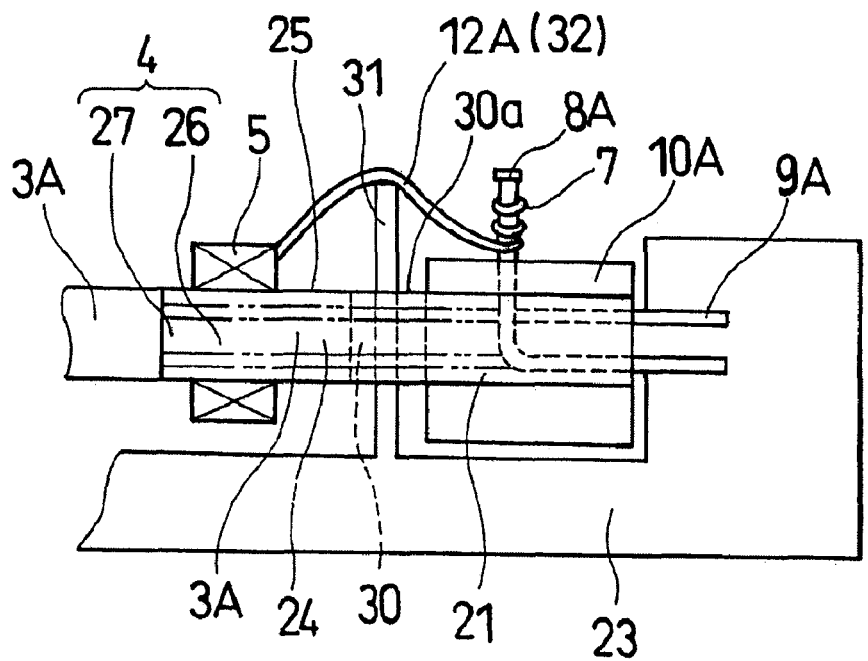
FIG. 2 is a partial cross-sectional view showing the slack-forming mechanism for stator coils of FIG. 1 and an attachment jig.
Figure 3:
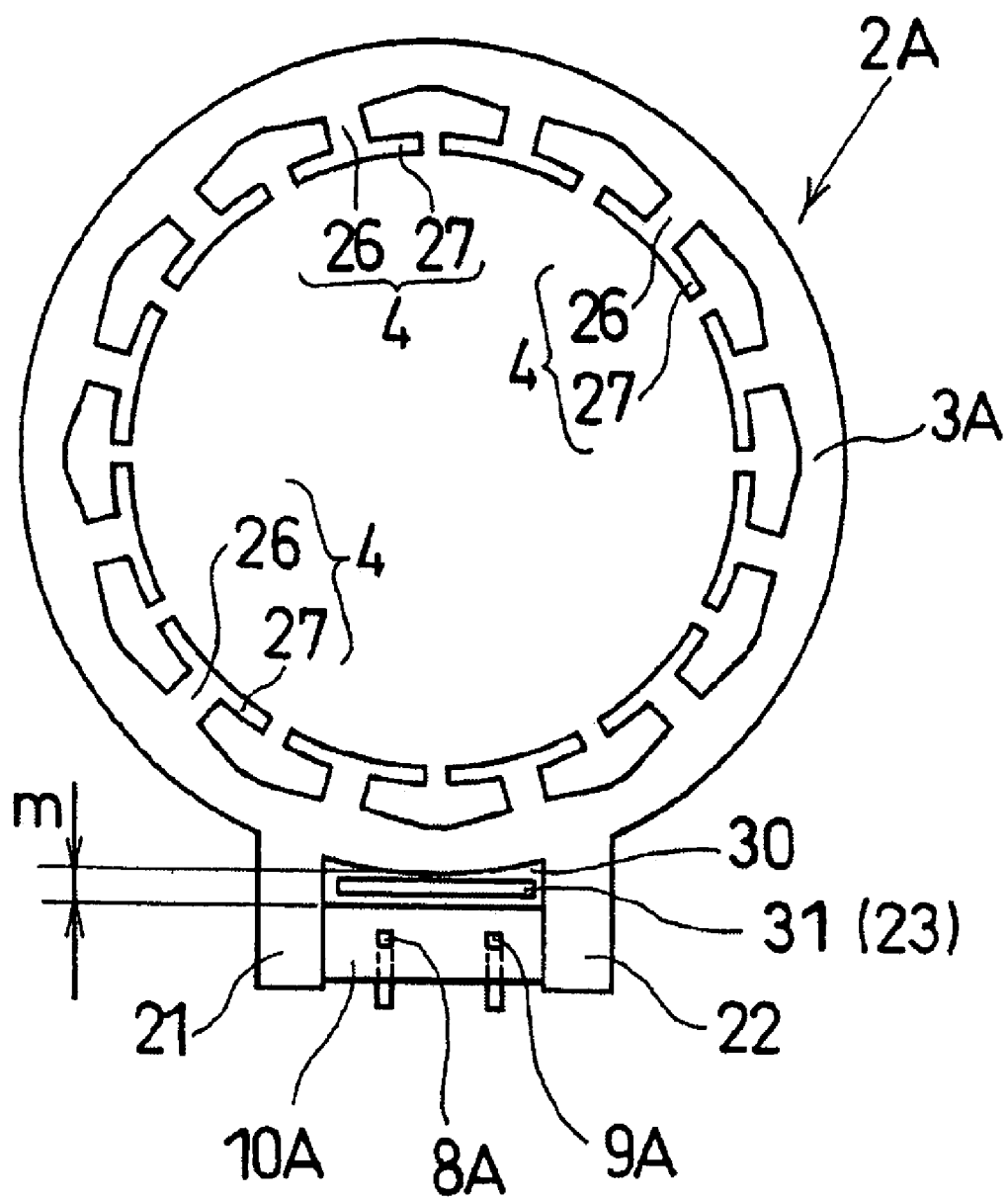
FIG. 3 is a top plan view showing the slack-forming mechanism for stator coils of FIG. 1 excluding stator coil 5.
Figure 4:
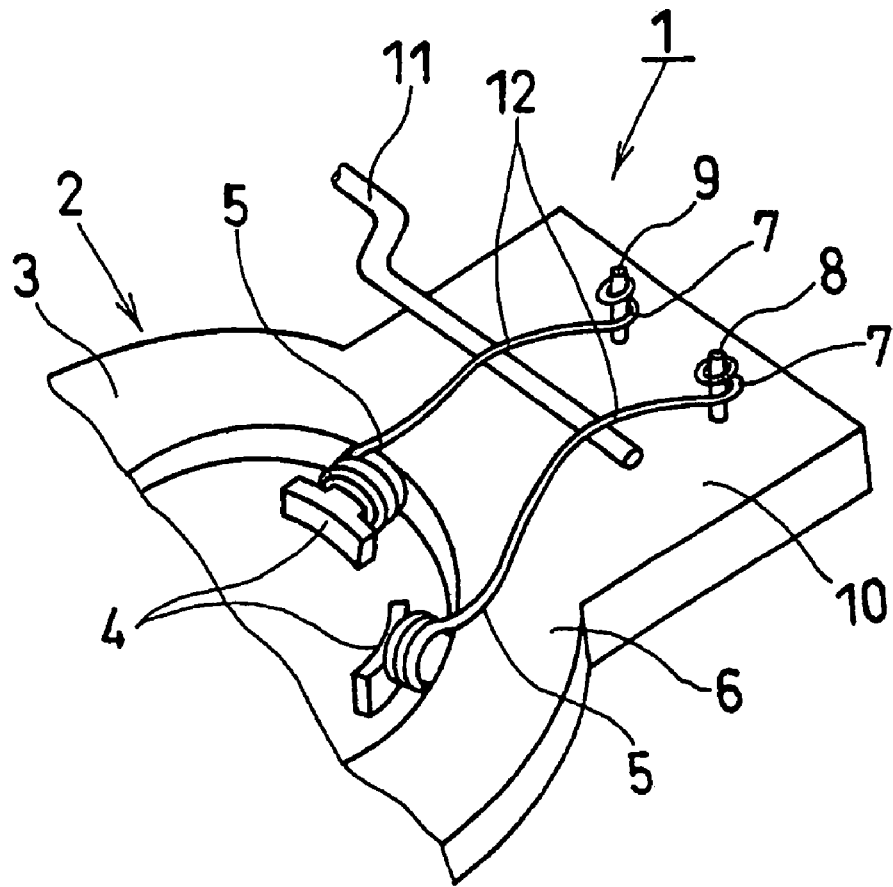
FIG. 4 is a perspective view showing one example of a conventional slack-forming mechanism for stator coils.
Figure 5:
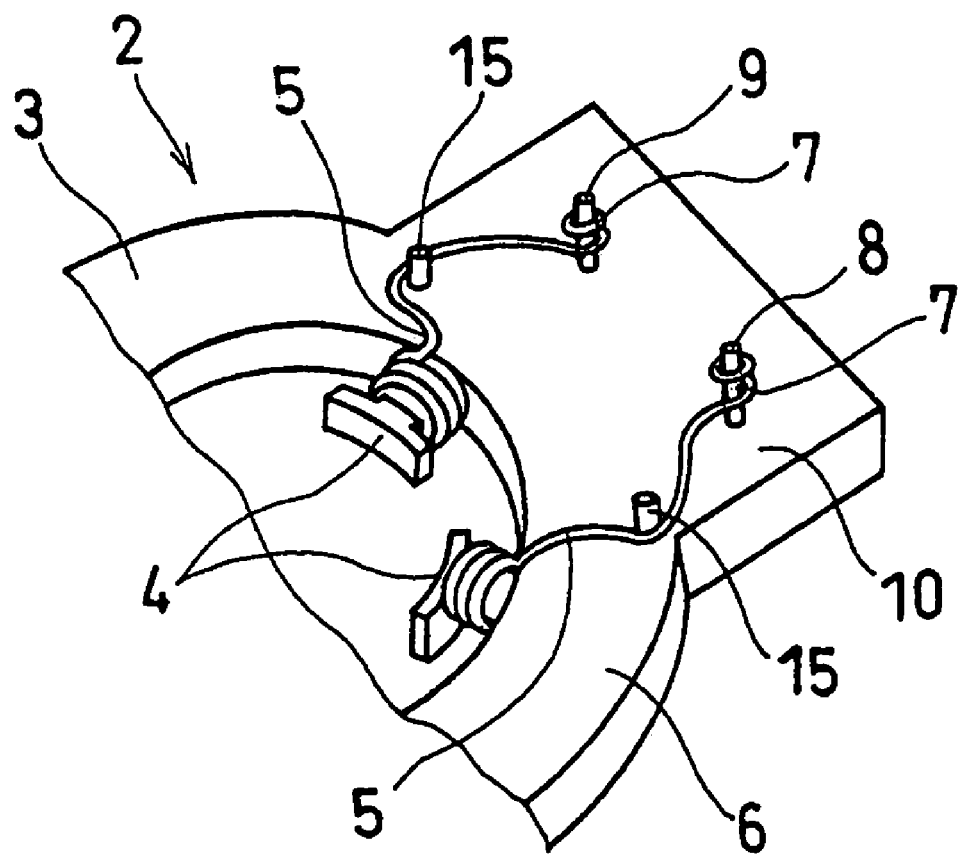
FIG. 5 is a perspective view showing another example of a conventional slack-forming mechanism for stator coils.

The slack-forming mechanism for stator coils pertaining to a first embodiment of this invention is explained with reference to FIGS. 1 through 3. An explanation and illustration of parts identical to those shown in FIG. 4 and FIG. 5 are omitted as appropriate.

The slack-forming mechanism for stator coils of this embodiment can be employed in the VR resolver 1A, which is one example of a rotating machine. In FIG. 1 to FIG. 3, the VR resolver 1A consists of the stator 2A and a rotor (not illustrated in the drawing) that is arranged inside the stator 2A. The stator 2A is provided with an annular stator stack 3A that possesses a plurality of magnetic teeth 4, stator coil 5 that winds around the plurality of magnetic teeth, a connector 10A that is provided with two attachment pins 8A, 9A to which the terminal part 7 of the stator coil 5 is twisted and that connect to outside wiring (not illustrated in the drawing), and two projecting parts (hereinafter, in FIG. 1, the projecting part on the right side is referred to as the first projecting part 21 and the one on the left side as the second projecting part 22) that are arranged in parallel at a fixed distance from each other on the outer periphery of the stator stack 3A and that hold in place the connector 10A arranged inside. The stator 2A is set in the coiling machine (not illustrated in the drawing) via the attachment jig (hereinafter referred to as the coiling machine attachment jig) 23, and in this set state, the winding (coiling treatment) of the stator coil 5 is conducted by the coiling machine.

The stator stack 3A is largely composed of a core part 24 produced by laminating multiple thin sheets (not illustrated in the drawing) that are made from a magnetic material and that are made roughly ring-shaped, insulation (omitted from the drawing) provided between the thin sheets of the core part 24, and an insulating cover 25 that is provided so as to cover the core part 24 containing the magnetic teeth 4. The magnetic teeth 4 are formed along an inner periphery of the core part 24. The magnetic teeth 4 consist of the magnetic tooth shaft 26 that axially extends toward the center of the stator stack 3A, and the arc-shaped magnetic tooth tip 27 that is provided at the end of the magnetic tooth shaft 26 and that faces the rotor with a fixed gap left open. The stator coil 5 wraps around the magnetic tooth shaft 26.

The connector 10A is placed between the aforementioned first projecting part 21 and second projecting part 22, and is held by the first projecting part 21 and second projecting part 22 by a holding means such as an adhesive agent that is not illustrated in the drawing. In this case, a clearance 30 is formed between the connector 10A and the stator stack 3A with a length m of a specified dimension (a length that allows for insertion of the below-mentioned fixture 31) as measured from the connector 10A to the stator stack 3A. The attachment pins 8A, 9A provided in the connector 10A roughly form an L-shape as shown in FIG. 2, with the head part protruding from the upper surface (the upper side in FIGS. 1 and 2) of the connector 10A, around which is wrapped the terminal part 7 of the stator coil 5. Moreover, the tips of the attachment pins 8A, 9A protrude from the back part (the right side in FIG. 2) of the connector 10A, and the outside wiring (not illustrated in the drawing) connects to the pertinent protruding part either directly or via a socket that is also not illustrated in the drawing.

In the coiling machine attachment jig 23, a board-like fixture 31 (slack-forming protruding member) is provided that passes through the aforementioned clearance 30 when the stator stack 3A is attached to the coiling machine via the coiling machine attachment jig 23. With regard to the fixture 31, the height of its top edge is set so that its position is higher than a level of the part of the stator coil 5 that traverses or passes over the clearance 30 ("the clearance pass-through part 32"). As shown in FIGS. 1 and 2, the clearance pass-through part 32 is interrupted by the fixture 31 and caused to cross over and contact it, thereby forming slack 12A in the stator coil 5.

In the slack-forming mechanism for stator coils configured in the above-described manner, first, the fixture or slack-forming member 31 is inserted through the clearance 30, the stator stack 3A is attached to the coiling machine via the coiling machine attachment jig 23, and the stator 2A is set in the coiling machine. At this time, the top edge of the fixture 31 is made to project upward through the open part 30a of the clearance 30, and is set so that its position is higher than the clearance pass-through part 32 of the stator coil 5 that traverses the open part 30a of the clearance 30. When the stator 2A is set in the coiling machine in the manner described above, winding of the stator coil is conducted by the coiling machine.

Next, the stator coil 5 (the clearance pass-through part 32) is made to contact the top edge of the fixture 31 and cross over it, and the terminal part 7 of the stator coil 5 is wrapped around attachment pins 8A, 9A of the connector 10.

By having the stator coil 5 (the clearance pass-through part 32) contact and cross over the top edge of the fixture 31 in this way, the clearance pass-through part 32 of the stator coil 5 is bent or diverted by the fixture 31.

After conducting coiling treatment of the stator coil 5 on the attachment pins 8A, 9A, the stator stack 3A (stator 2A) is removed from the coiling machine attachment jig 23. By doing so in a state where the stator coil 5 has been bent by the fixture 31 in the above-described manner, slack 12A is formed in the clearance pass-through part 32 of the stator coil 5 when the stator stack 3A is removed from the coiling machine attachment jig 23.

According to this embodiment, as slack 12A is formed in the stator coil 5 by the fixture 31 provided in the coiling machine attachment jig, it is possible to form slack 12A without changing the configuration of the coiling machine that is conventionally used. As a result, it is possible to avoid complicating the mechanism of the coiling machine, the destabilization of the operation of the slack-forming mechanism for stator coils accompanying this complication, the increased difficulty of maintaining uniform slack amounts, and the decline in reliability, all of which is caused by the conventional technology (FIG. 4) that provides a slack-forming mechanism for stator coils in the coiling machine. That is, it is possible to form slack 12A of appropriate size in the stator coil 5 without imposing any kind of burden on the coiling machine.

Moreover, as one is able to configure the slack-forming mechanism for stator coils by forming the clearance 30 between the connector 10 and the stator stack 3A, and by structural changes that are comparatively narrow in scope, few design-related restrictions are present compared to the conventional technology (FIG. 5) where slack is formed in the stator coil by attaching by-pass pins. As a result, it is possible to form a sufficiently large slack 12A in the stator coil 5, and consequently to adequately suppress breakage of the stator coil 5 induced by temperature change.

Accordingly, a stator is provided that forms a clearance between the connector and the stator stack, which is set in the coiling machine. The coiling machine is attached to the stator stack via an attachment jig, which is provided with a protruding member that passes through the clearance and has a top edge that projects above the open part of the clearance, so that as the stator coil that traverses the open part of the clearance contacts the protruding member slack is formed in the stator coil. In this manner, slack is formed in the stator coil without changing the configuration of the coiling machine, thereby simplifying the mechanism of the coiling machine, and avoiding the complications in the prior art mechanisms such as an increase in the difficulty of maintaining uniform slack amounts, and the decline in reliability. In other words, with the slack-forming mechanism of the present invention no burden is placed on the coiling machine and slack of appropriate size is formed in the stator coil.

While particular embodiments of the present invention have been described, it will be apparent to those skilled in the art that changes and modifications may be made without departing from this invention in its broader aspect and, therefore, the appended claims are to encompass within their scope all such changes and modifications that fall within the true sprit and scope of this invention.

What is claimed is:

1. A slack forming mechanism for an annular stator stack including a plurality of magnetic teeth on an inside wall, stator coils that wind around the plurality of magnetic teeth and having terminal parts, a connector provided with attachment pins to which the terminal parts of each of the stator coils are coupled, and two projecting parts that extend substantially in parallel from an outer periphery of the stator stack and that hold the connector arranged between them such that a clearance is formed between the connector and the stator stack, the slack forming mechanism comprising an attachment jig for coupling the stator stack to a coiling machine and including a protruding member extending through the clearance and having a top edge that projects above the clearance, wherein slack is formed in a stator coil by having the stator coil traverse the clearance and contact the protruding member to upwardly deflect the stator coil to form the slack.

2. The slack forming mechanism of claim 1 wherein the clearance is substantially rectangular in shape and the protruding member is substantially rectangular in shape.

3. A slack forming mechanism comprising a stator attachment jig for receiving and coupling a stator to a coil winding machine and a slack forming member extending from the jig and adapted to extend through an opening between a stator body and a coil wire connector, the slack forming member upwardly deflecting a winding coil to create slack in a coil, and wherein the slack forming member is integral with the attachment jig and extends through the opening formed between an outer periphery of a stator body and a coil wire connector.

* * * * *